United States Patent [19]

Abe

[11] 3,804,975

[45] Apr. 16, 1974

[54] VIDEO SIGNAL DATA SIGNAL COMPRESSION SYSTEM

[75] Inventor: Takeshi Abe, Yokohama, Japan

[73] Assignee: Ricoh Co., Ltd., Tokyo, Japan

[22] Filed: Dec. 27, 1972

[21] Appl. No.: 318,842

[30] Foreign Application Priority Data

Dec. 30, 1971 Japan .................................. 46-1167

[52] U.S. Cl. ................................ 178/6, 178/DIG. 3

[51] Int. Cl. ............................................ H04n 7/12

[58] Field of Search ......... 178/6, DIG. 3; 179/15.55

[56] References Cited

UNITED STATES PATENTS 3,347,981 10/1967 Kagan et al. ............................ 178/5

3,521,241 7/1970 Rumble ........................... 340/172.5

*Primary Examiner*—Howard W. Britton

*Assistant Examiner*—Edward L. Coles

*Attorney, Agent, or Firm*—Cooper, Dunham, Clark, Griffin & Moran

[57] ABSTRACT

A video signal data compression system is provided in which the video signals obtained by scanning an image or subject copy by a facsimile scanner are quantized and sampled so as to derive quantized bit patterns consisting of bits 1's representing black elementary areas and bits 0's representing white elementary areas, and the bits of the two quantized bit patterns for adjacent scanning lines are alternately rearranged by interleaning so as to provide a synthesized bit pattern. Thereafter the synthesized bit pattern is coded and compressed.

4 Claims, 5 Drawing Figures

VIDEO SIGNAL DATA SIGNAL COMPRESSION SYSTEM

BACKGROUND OF THE INVENTION

The present invention relates to a video signal data compression system, and more particularly a system for compressing the video signals obtained by scanning an image or subject copy to be transmitted.

In the conventional facsimile system in a transmitting station an image or subject copy is scanned and converted into the electric video signals for transmission. At a receiving station the received video signals are applied to a facsimile recording system so as to reproduce the subject copy on a recording sheet. However when every electric pulse or video signal representing the blackness of an elementary area or dot of the subject copy is transmitted, the transmission time as well as the transmission charge are much increased. In order to decrease the transmission time in the facsimile system there has been proposed and demonstrated the run length coding method. In general the elementary areas or dots along one scanning line of a subject copy will not so often change from black or white elementary areas to white or black areas, but the black and white elementary areas continue in succession for some length. Therefore the video signals obtained by scanning a subject copy generally contain a series of the bits 1's in succession and also a series of bits 0's in succession. The number of the same bits 1's or 0's which continue in succession is called the run length. In the run length coding method the run lengths are encoded by the pure binary code or the like so as to compress the video signals which are otherwise long.

Another method for compressing the facsimile signals or reducing the facsimile transmission time is the delta coding method. In general the corelation between the two quantized bit patterns for the adjacent scanning lines which are closedly spaced apart is very strong so that the bit patterns for the two scanning lines are substantially equal or are different from each other only by a few bits at the most. The delta coding method is based upon this observed fact. More particularly the two quantized bit patterns for the adjacent scanning lines are compared bit by bit so that when the bits in the corresponding positions of the two bit patterns are different, the signal 1 is generated, but when the bits in the corresponding positions are coincident with each other, the signal 0 is generated. A new bit pattern consisting of the bits 0's and 1's thus obtained is further compressed by the run length method described above, and transmitted to a receiving station. Therefore the 1 repetition rate in the compressed bit pattern is considerably lower than that in the original bit pattern whereas the 0 repetition rate becomes higher. Therefore the signal or data compression efficiency may be much improved over the compression method in which the original bit pattern is directly converted into the code form.

The conventional data compression methods such as the run length coding method, the delta coding method and the like are generally based upon the principle that the video signals or bit pattern for each scanning line is coded or compressed. Therefore they impose the limit on the data compression ratio. This unsatisfactory data or signal compression ratio is one of the reasons why it is difficult to couple the facsimile system to the existing telephone system.

One of the objects of the present invention is therefore to provide an improved data compression system which may further compress the data to a degree hitherto unattainable by the conventional data compression systems.

Another object of the present invention is to provide an improved data compression system in which two bit patterns for adjacent scanning lines may be synthesized, coded and compressed so as to attain the high data compression ratio hitherto unobtainable by the conventional data compression methods.

As described above it is very rare that the bit 1 or 0 changes to 0 or 1 from one bit position to another, but a series of bits 1's or 0's generally continue in succession for some length. Furthermore as described above in connection with the delta coding method the corelation or similarity between the two bit patterns for two adjacent scanning lines is very strong. Generally only a few bits at both ends of one bit pattern are different from the bits in the corresponding bit positions of another bit pattern. The present invention makes full use of the above described advantages of the two conventional coding methods so as to further compress the video signal or data.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
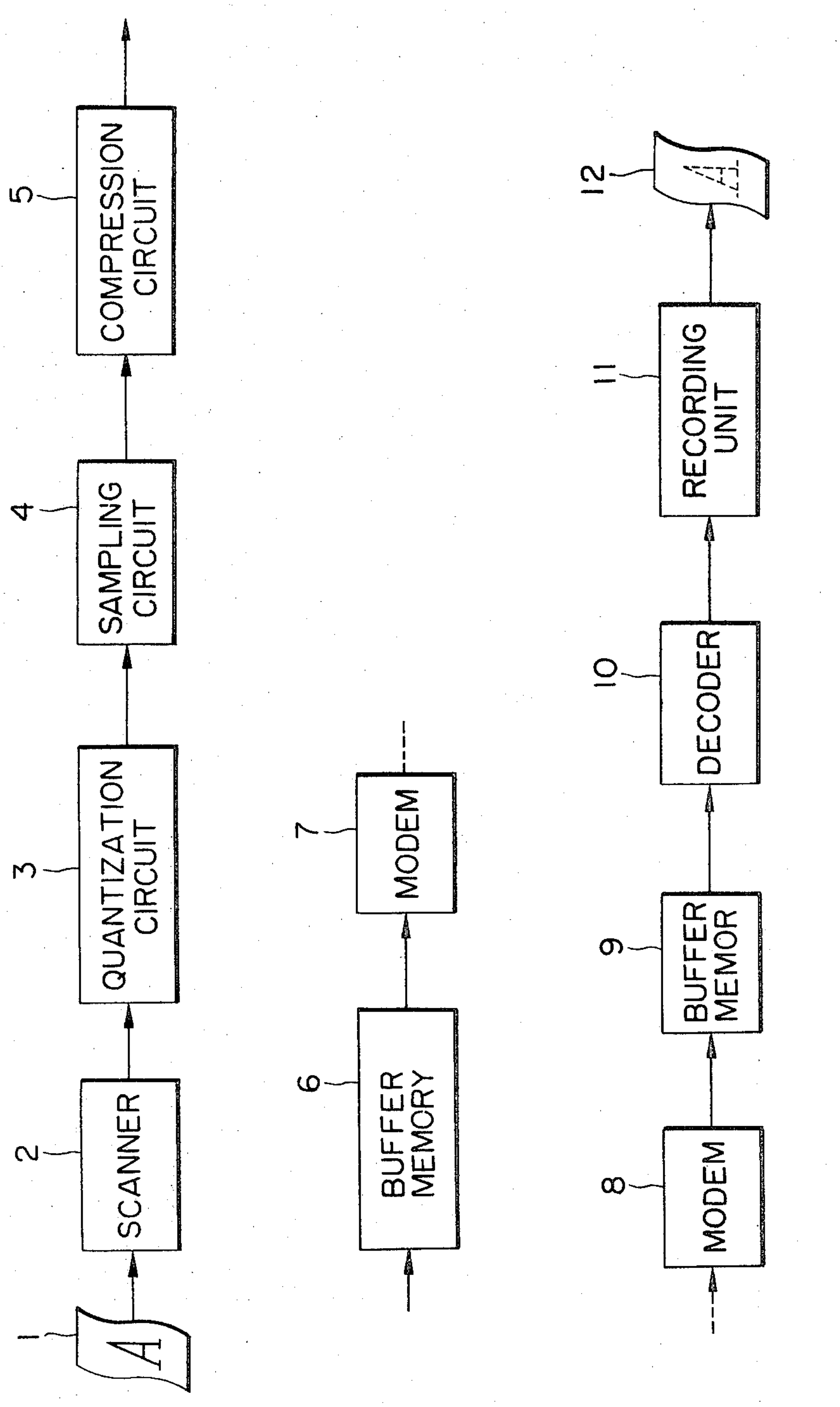
FIG. 1 is a block diagram of a standard conventional facsimile system to which is applied the present invention.

FIG. 1 shows in block diagram a standard facsimile system. A subject copy 1 is scanned by a scanner 2 so that the black and white patterns on the subject or image copy 1 are converted into the electric video signals. The output signals from the scanner 2 are quantized by a quantization circuit 3 into the signal 1 representing a black area and the signal 0 representing a white area. The output signals of the quantization circuit 3 are applied to a sampling circuit 4 so that they are converted into the bit patterns consisting of bit signals 1 and 0 which now represent a black and white elementary areas or dots of the subject copy 1. The output signals of the sampling circuit 4 are then compressed by a data compression circuit 5 and are stored into a buffer memory 6. The compressed data stored in the buffer memory 6 are read out at a desired speed so as to be transmitted through a transmission modem 7 on a transmission line L to a receiving station. At the receiving station the compressed data transmitted on the transmission line L are received by a receiver modem 8 and are stored into a buffer memory 9. The compressed data stored in the buffer memory 9 are read out at a desired speed, decoded into the original bit patterns by a decoder 10 and fed into a facsimile recording unit 11 so as to reproduce the subject copy 1 on a recording sheet 12.

Figure 2:
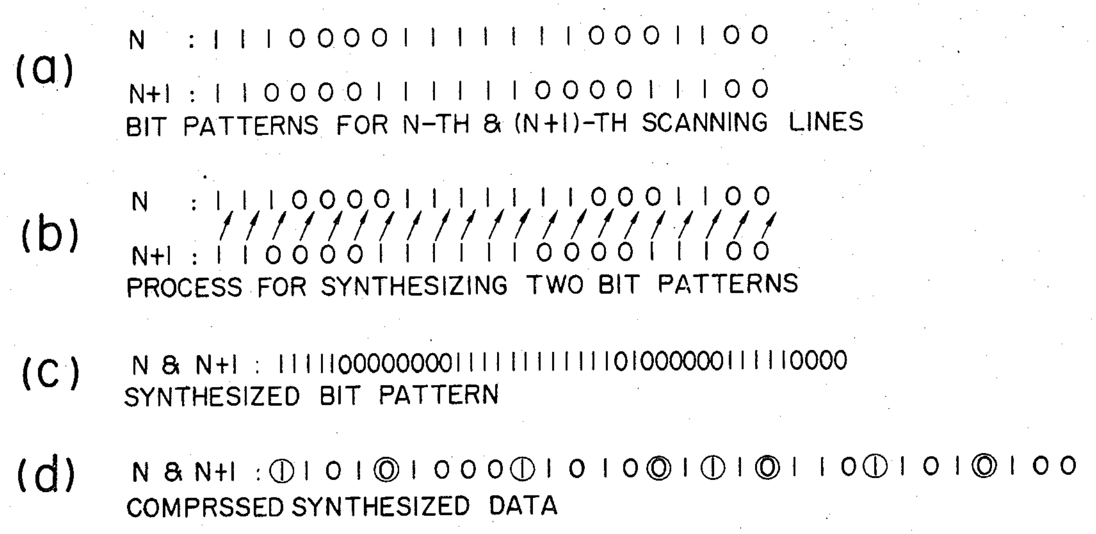
FIG. 2 is a view used for the explanation of the principle of the present invention.

Next referring to FIG. 2 the principle of the present invention will be described. Assume that the bit patterns of the adjacent N-th and (N +1)-th scanning lines are represented as shown in FIG. 2(*a*). The two bit patterns are then synthesized as shown in FIG. 2(*b*) so that a synthesized bit pattern as shown in FIG. 2(*c*) may be obtained in which the bit signals of the N-th and (N + 1)-th bit patterns are alternately arranged. From the synthesized bit pattern shown in FIG. 2(*c*) it is readily seen that the run length of bits 1's or 0's is longer than those in the original bit patterns. This means that in the synthesized bit pattern the chance of the bit signal 1 changing into the bit 0 or vice versa is considerably reduced as compared with the original patterns. Therefore it will be apparent that the efficiency of the data compression of the synthesized pattern shown in FIG. 2(*c*) is considerably higher than that of the data compression of the original patterns. The synthesized bit pattern is compressed as shown in FIG. 2(*d*) by representing the run length by pure binary codes. In FIG. 2(*d*) the symbol one and zero represent the signal used for discriminating the 1 run length and 0 run length respectively. The compressed data or binary-coded synthesized bit pattern shown in FIG. 2(*d*) is merly one example of the data compression methods, and the synthesized bit pattern may be compressed by any suitable method.

Figure 3:
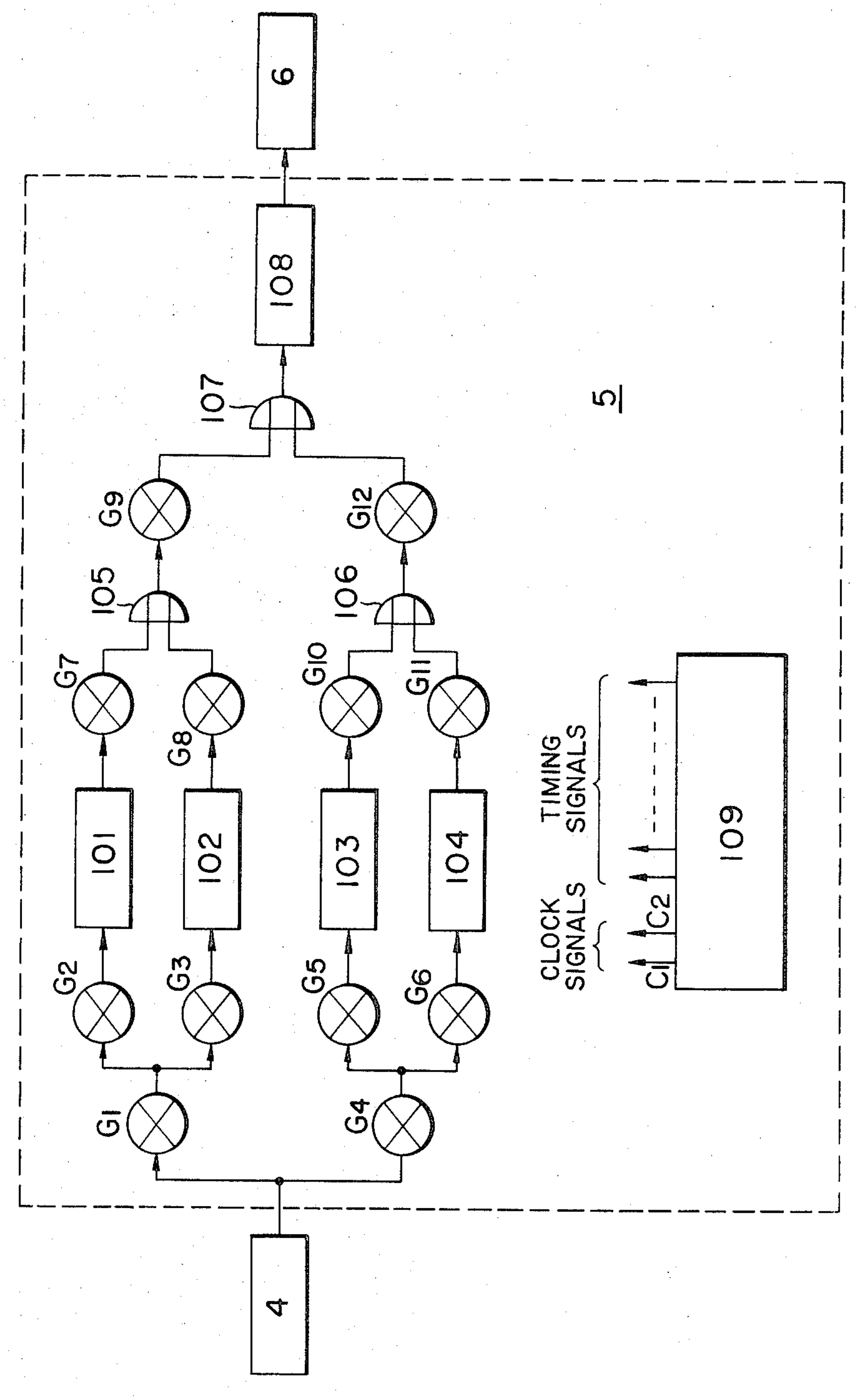
FIG. 3 is a block diagram of one preferred embodiment of the present invention.

Referring to FIG. 3, the data compression circuit 5 adapted to carry out the data compression method in accordance with the present invention will be described in detail hereinafter. The data compression circuit 5 generally comprises four shift registers 101–104 each for storing one bit pattern for one scanning line; three OR gates 105, 106 and 107, an encoder 108, a control unit 109 and a plurality of gate circuits $G_1$–$G_{12}$. The shifts in the shift registers 101–104 and the ON-OFF operations of the gates $G_1$–$G_{12}$ are controlled in response to the clock and timing signals supplied from the control unit 109. The encoder 10 is inserted between the sampling circuit 9 and the buffer register 11 (See FIG. 1).

Figure 4:
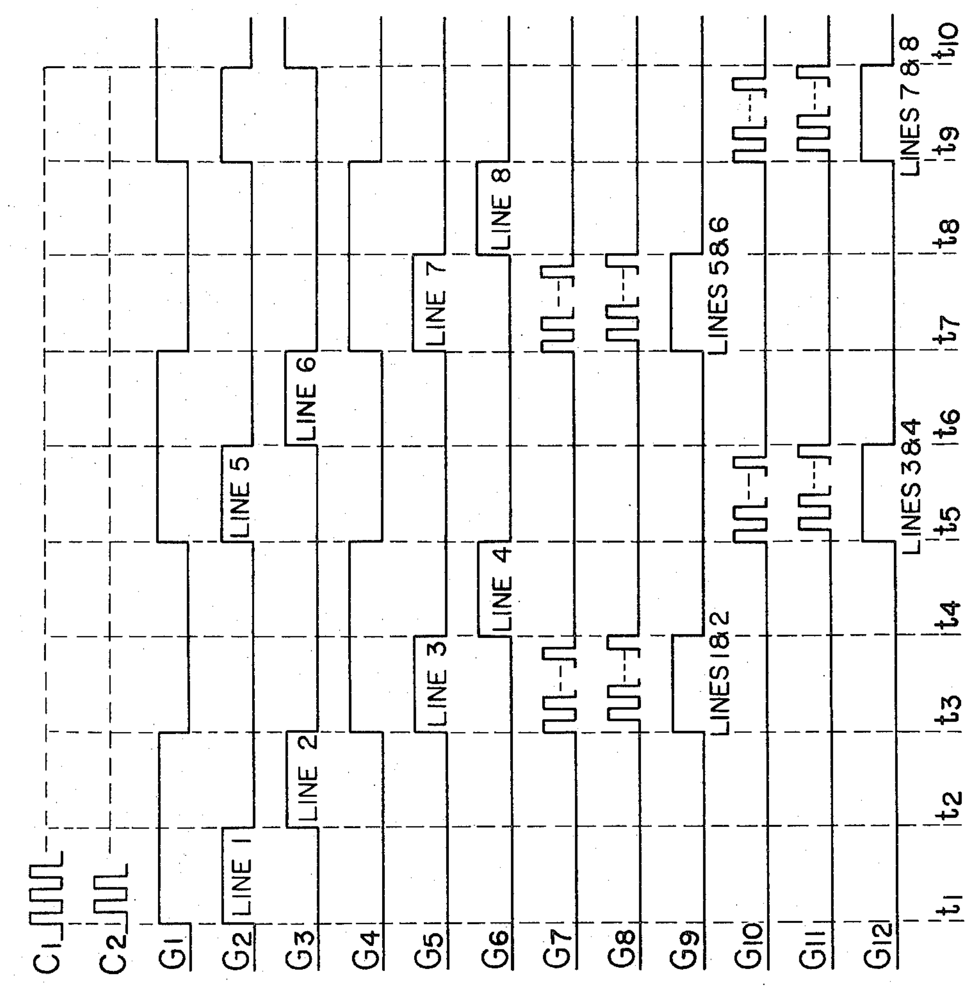
FIG. 4 is a timing chart used for the explanation of the mode of operation thereof.

FIG. 4 shows a timing chart of ON-OFF operations of the gates $G_1$–$G_{12}$ in response to the clock signals $C_1$ and $C_2$. The gates $G_1$ and $G_2$ are turned on at time $t_1$ so that the bit pattern of the first scanning line is transferred from the sampling circuit 4 through the gates $G_1$ and $G_2$ into the first shift register 101. At time $t_2$, the gate $G_2$ is turned off but the gate $G_3$ is turned on while the gate $G_1$ remains turned on so that the bit pattern of the second scanning line is transferred from the sampling circuit 4 into the second shift register 102 through the gate $G_3$. In a similar manner at $t_3$, the bit pattern of the third scanning line is transferred through the gates $G_4$ and $G_5$ into the shift register 103 and at $t_4$ the bit pattern of the fourth scanning line is transferred through the gates $G_4$ and $G_6$ into the fourth shift register 104.

During the time duration from $t_3$ to $t_4$ and from $t_7$ to $t_8$ the gates $G_7$ and $G_8$ are alternately turned on and turned off in response to the clock signals $C_1$ and $C_2$ whereas the gate $G_9$ remains in the on state. Therefore the bit signals of the bit patterns of the first and second scanning lines stored in the first and second shift registers 101 and 102 are alternately transmitted through the gates $G_7$ and $G_8$, the OR gate 105, the gate $G_9$ and the OR gate 107 to the encoder 108. It is readily seen that in this step the two bit patterns of the adjacent scanning lines are synthesized in the manner described above with reference to FIGS. 2(*a*), 2(*b*) and 2(*c*) and that the bit pattern as shown in FIG. 2(*c*) is transferred into the encoder 108. In the encoder 108 the synthesized bit pattern is converted or compressed into the compressed data as shown in FIG. 2( *d*) and is stored in the buffer memory 6.

In like manner the gates $G_{10}$ and $G_{11}$ are alternately turned on and turned off between $t_5$ and $t_6$ while the gate $G_{12}$ remains turned on so that the bit signals of the bit patterns of the third and fourth scanning lines are alternately transferred from the third and fourth shift registers through the OR gate 106, the gate $G_{12}$ and the OR gate 107 into the encoder 108. Thus the bit patterns are synthesized and compressed by the encoder 108 and then transferred into the buffer memory 6. While the bit patterns in the third and fourth shift registers 103 and 104 are processed in the manner described above, the bit patterns of the fifth and sixth scanning lines are sequentially stored in the first and second shift registers 101 and 102 respectively in the manner described above. The above operations are cycled as shown in FIG. 4. Any suitable conventional encoder such as disclosed for example in U.S. Pat. No. 3,035,121 may be used so that no detailed description will be made in this specification.

Figure 5:
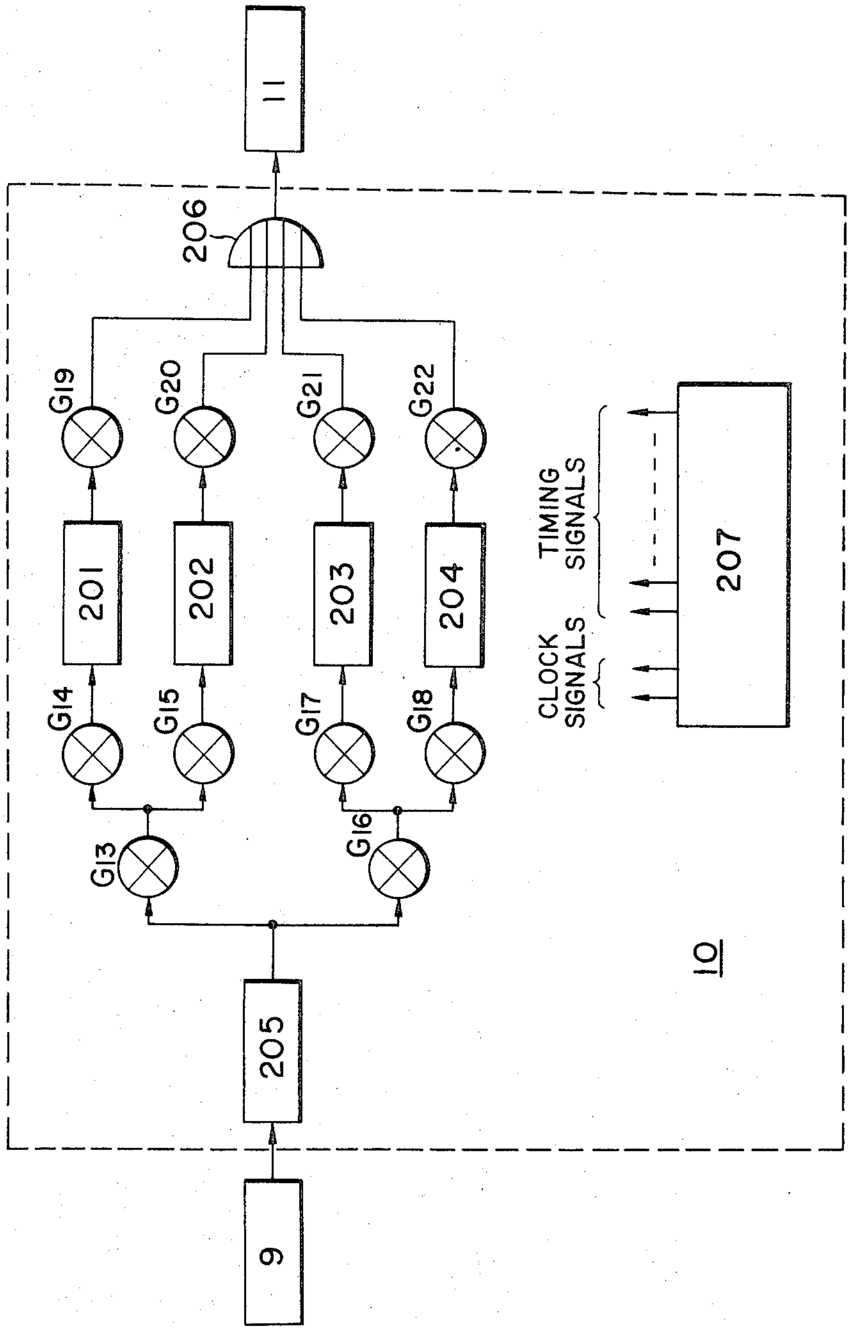
FIG. 5 is a block diagram of a decoding circuit adapted to decode the compressed video-signals or data compressed by the system shown in FIG. 3.

The compressed data obtained in the manner described above may be expanded or decoded into the original bit patterns for individual scanning lines by a data expansion circuit shown in block diagram in FIG. 5. The data expansion circuit generally indicated by 10 and interposed between the buffer register 9 and the facsimile recording system 11 comprises a decoder 205 for decoding the compressed data into the bit patterns for individual scanning lines, four shift registers 201–204 for storing the decoded bit pattern for each scanning line, an OR gate 206, a plurality of gate circuits $G_{13}$–$G_{22}$ and a control unit 207. The operations of the shift registers 201–204 and of the gates $G_{13}$–$G_{22}$ are controlled in response to the timing and clock signals supplied from the control unit 207.

The compressed data as shown in FIG. 2(*d*) are sequentially transferred from the buffer register 9 into the decoder 205 and decoded into the synthesized bit patterns as shown in FIG. 2(*c*) in which the bit signals of the bit patterns of the adjacent scanning lines are alternately arrayed. While the gate $G_{13}$ remains turned on, the gates $G_{14}$ and $G_{15}$ are alternately turned on and turned off so that the bit signals of the bit pattern for one scanning line are stored in the shift register 201 through the gate $G_{14}$ whereas the bit signals of the bit pattern for the next scanning line are stored in the second shift register 202 through the gate $G_{15}$. In like manner while the gate $G_{16}$ remains turned on the gates $G_{17}$ and $G_{18}$ are alternately turned on and turned off so that the bit signals of the bit patterns for individual scanning lines are stored into the third and fourth shift registers 203 and 204 through the gates $G_{17}$ and $G_{18}$, respectively.

When the gate $G_{19}$ is turned on the bit pattern stored in the shift register 201 is supplied through the OR gate 206 to the facsimile recording system 11. In like manner the bit pattern for the next scanning line is supplied to the facsimile recording system 11 through the gate $G_{20}$ and thereafter the bit patterns for individual scanning lines are stored into the first and second shift registers 201 and 202 in the manner described above while the bit patterns in the third and fourth shift registers 203 and 204 are sequentially supplied to the facsimile recording system through the gates $G_{21}$ and $G_{22}$ and through the OR gate 206. The above operation is cycled until the subject or image copy is completely reproduced.

So far only the essential features of the present invention have been described with reference to the accompanying drawing illustrating only one preferred embodiment thereof, but it will be understood that various modifications and variations may be effected. For example the bit patterns of the three succeeding scanning lines may be synthesized into one bit pattern and then compressed. Furthermore the data compression method in accordance with the present invention may be used in conjunction with the data compression system of the type in which a bit pattern for one scanning line is compressed or coded when the corelation between the bits in the corresponding positions of the bit patterns of the two adjacent scanning lines is high whereas the bit pattern which is not compressed or coded is transmitted when the corelation between the bit patterns of the adjacent scanning lines is low. In this case, the data compression and expansion circuits shown in the drawing must be of course modified.

What is claimed is:

1. A video signal data compression system comprising a. means for quantizing and sampling the video signals obtained by scanning an image or subject copy to be transmitted so as to provide the quantized bit patterns for individual scanning lines, each bit pattern consisting of bits 1's and 0's, the bit 1 representing a black or white elementary area the bit 0 representing a white or black elementary area respectively, b. means for arranging sequentially the bits in the same bit positions of the quantized bit patterns for a plurality of succeeding scanning lines to provide a synthesized bit pattern, and c. means for coding and compressing said synthesized bit pattern.

2. A video signal data compression system as defined in claim 1 wherein said synthesized bit pattern is obtained by quantizing, sampling and synthesizing two bit patterns for adjacent scanning lines.

3. A video signal data compression system comprising a. means for quantizing and sampling the video signals obtained by scanning an image or subject copy to provide quantized bit patterns for individual scanning lines, each pattern consisting of bits 1 and 0, the bit 1 representing a black or white elementary area and the bit 0 representing a white or black elementary area respectively, b. at least two shift registers each capable of storing therein one quantized bit pattern for one scanning line, c. means for storing the quantized bit pattern for one scanning line into one of said at least two shift registers while storing the quantized bit pattern for the next scanning line into the other shift register, d. means for alternately reading out the bits of said two quantized bit patterns from said at least two shift registers to provide a synthesized bit pattern of said two quantized bit pattern, and e. means for coding and compressing said synthesized bit pattern.

4. A video signal or data compression system as defined in claim 3 further comprising two more shift registers, and means for storing two quantized patterns for two scanning lines succeeding to said next scanning line into said second mentioned two shift registers respectively while the bits of said quantized patterns stored in said first mentioned shift registers are being alternately read out, and for storing two quantized patterns for two scanning lines succeeding to said last mentioned scanning line into said first mentioned shift registers respectively while the bits of said two quantized patterns stored in said second mentioned two shift registers are being alternately read out.

* * * * *